United States Patent [19]

Elliott, Jr.

[11] 3,709,627
[45] Jan. 9, 1973

[54] CUTTING TOOL
[76] Inventor: Olin S. Elliott, Jr., 2011 Cleveland Street, Greenville, S.C. 29607
[22] Filed: June 30, 1971
[21] Appl. No.: 158,160

[52] U.S. Cl. ............... 408/204, 143/85 A, 408/703
[51] Int. Cl. ..................... B23b 41/02, B23b 51/04
[58] Field of Search ... 408/204, 703; 143/85 R, 85 A; 144/23; 30/301; 90/11 A

[56] References Cited

UNITED STATES PATENTS 2,674,026   4/1954   Palley ............................... 408/204 X
2,473,077   6/1949   Starbuck, Jr. ..................... 408/703 X Primary Examiner—Gil Weidenfeld
Attorney—Ralph Bailey, Jr. et al.

[57] ABSTRACT

A tool adapted to be placed in a power driven rotated member, such as a chuck, for making curved cuts in material. The tool includes a circular flywheel which has a flexible elongated saw blade attached to the periphery thereof. A pivotal arm engages one end of the blade so that by adjusting a bolt which bears against the other end of the pivotal arm the blade can be drawn tightly around the periphery of the flywheel.

5 Claims, 3 Drawing Figures

PATENTED JAN 9 1973
3,709,627
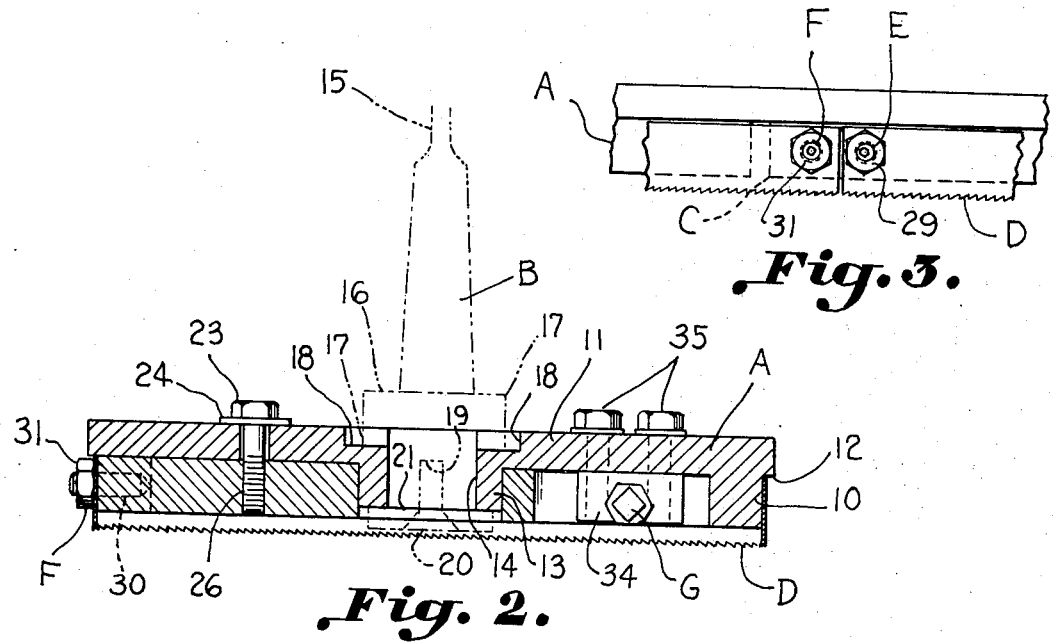
Fig. 3.
Fig. 2.
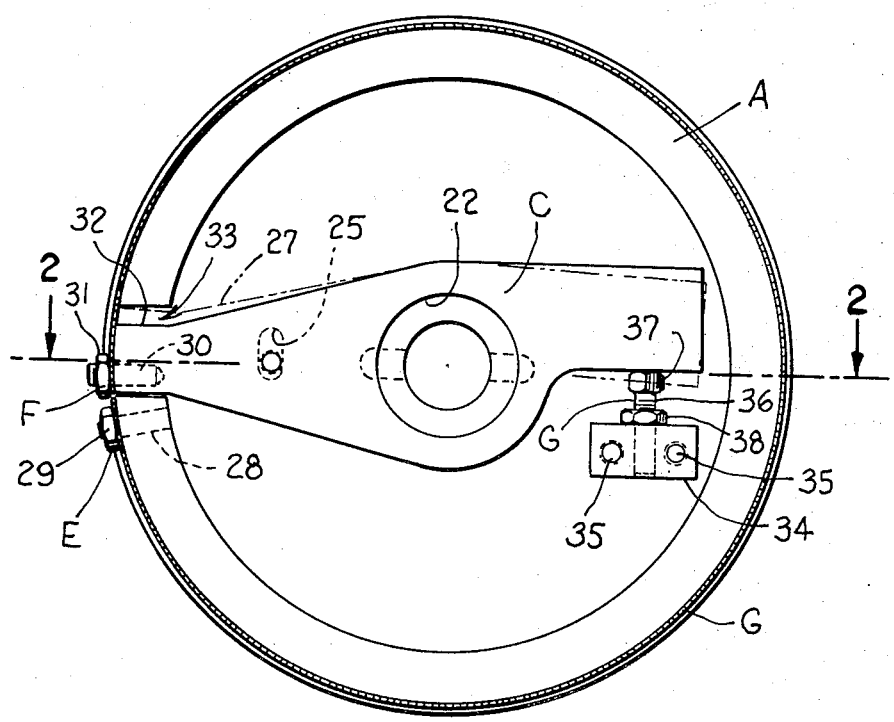
Fig. 1.
INVENTOR.
OLIN S. ELLIOTT, JR.
BY Bailey & Dority
ATTORNEYS.

CUTTING TOOL

This invention relates to a cutting tool, and more particularly to a cutting tool which is capable of making curved cuts.

Heretofore, when it was desired to make a curved cut in metal or the like, generally a band saw was utilized. One of the problems in the use of band saws is that the blade would sometimes move as pressure is exerted during the cutting operation. Not only does the moving of the blade effect the accuracy of the cut, but it also causes wear of the blade.

Another problem presented in utilizing a band saw for making curved cuts in metal, is since the teeth are moving in a direction perpendicular to the material being cut, marks are made in the material during the cutting operation requiring grinding to produce an extremely smooth surface.

Hole saws have been utilized for making curved cuts, but generally such are not available above 6 inches and the blade is a continuous circular blade. Elongated blades have been utilized and placed in circular grooves in the base of a hole saw. The blade is anchored by appropriate pins passing through the ends of the blade into the housing in which the groove is carried.

One problem with such hole saws is that the blade must be accurately cut in length and the holes through which the pins pass must also be accuractely punched or drilled in order that they be in proper alignment with the securing pins.

Cutting tools constructed in accordance with the present invention are very stable as a result of the weight involved and can utilize conventional band saw blades which are cut to suitable lengths. The band saw blade is wrapped around the flywheel and a pivotal arm engages one end thereof for drawing the blade tightly against the periphery of the flywheel. Such produces a very stable cutting tool that produces accurate cuts with a minimum of chatter, minimizing wear on the blade. Since the blade is held tightly against the periphery of the flywheel, the blade does not tend to twist during the cutting operation.

Accordingly, it is an important object of the present invention to provide a cutting tool which is stable and can make large circular cuts.

Another important object of the present invention is to provide a cutting tool which can utilize an elongated blade that can be drawn tightly around a flywheel to produce a circular cutting blade.

Still another important object of the present invention is to provide a cutting tool which utilizes an elongated tooth blade which has one end secured to a pivotal arm so that by adjusting the pivotal arm the blade can be drawn tightly around the periphery of a flywheel supporting the blade.

Still another important object of the present invention is to provide a cutting tool wherein the length of the cutting blade can be varied by placing shims between a flywheel upon which the blade is carried, and the blade, so that various diameter cuts can be made.

The construction designed to carry out the invention will be hereinafter described, together with other features thereof.

The invention will be more readily understood from a reading of the following specification, and by reference to the accompanying drawing forming a part thereof, wherein an example of the invention is shown and wherein:

FIG. 1 is a plan view taken from the bottom illustrating a cutting tool constructed in accordance with the present invention.

FIG. 2 is a sectional view taken along line 2—2 of FIG. 1, showing the cutting tool constructed in accordance with the present invention, and FIG. 3 is a fragmentary elevational view illustrating the manner in which the saw blade is attached to the flywheel forming part of the cutting tool.

The drawing illustrates a tool capable of being rotated by a power driven rotating member, such as a motor driven chuck, for making curved cuts in the material. The tool includes a circular flywheel A having a shaft B carried in the center thereof extending vertically from the flywheel A for being received by a power driven rotating member (not shown). A pivotal arm C is carried by the flywheel A and has one end terminating adjacent the periphery of the flywheel. A flexible elongated saw blade D having cutting teeth on one edge extends around the circular flywheel A. Means E is provided for attaching one end of the saw blade D to the flywheel A adjacent one end of the pivotal arm C. Means F is provided for attaching the other end of the saw blade E to the one end of the pivotal arm. Means G is provided for adjusting the pivotal arm C for drawing the saw blade D tightly around the circular flywheel A.

The flywheel is constructed of any suitable material, such as cast iron, and in one particular instance, it is approximately 9⅞ inches in diameter and weighs with the shaft B approximately 20 pounds. Such weight produces a smooth cutting action when the cutting tool is used for cutting metal.

The flywheel A is circular in shape and has a circular shoulder 10 extending downwardly from a relatively flat main body portion 12. The outer periphery of the circular shoulder 10 defines the perimeter of the flywheel. Jutting outwardly from adjacent the top of the circular shoulder 10 is an abutment 12 which extends around the outer edge of the flywheel. This abutment 12 is provided for engaging the inner edge of the saw blade 10 for preventing upward movement of the saw blade during the cutting operation. The flywheel has a circular collar 13 centrally located thereto and extending downwardly. The collar 13 has a bore 14 extending therethrough for receiving the shaft B.

The shaft B may be constructed of any suitable material, such as steel, and has a reduced portion 15 adjacent the top which is adapted to fit within a conventional chuck of a power driven rotating member. The shaft B has a collar 16, the lower portion of which rests on the top of the main body portion of the flywheel 11. Jutting outwardly from the collar 16 and integral therewith are a pair of diametrically disposed keys 17 which fit within complementary shaped slots 18 provided in the flywheel A so that when the shaft B is rotated torque is applied through the keys 17 to the flywheel for rotating the flywheel A. The base of the shaft B has a threaded bore 19 therein which receives a screw 20 upon which a washer 21 is carried. When the screw 20 is drawn tightly within the bore 19 the washer 21 engaging the bottom of the collar 13 draws the keys 17 within the slots 18 to rigidly secure the shaft B to the flywheel.

An elongated pivotal arm C is provided for adjusting the tension in the saw blade D. The pivotal arm C has a bore 22 extending therethrough which is slightly larger than the outer diameter of the collar 13 so that it will fit over the collar. A screw 23 having a washer 24 thereon, extends through an elongated slot 25 provided in the flywheel and engages a threaded bore 26 in the pivotal arm for securing the arm to the flywheel. By loosening the screw 23 such allows the pivotal arm C to be pivoted from the phantom position shown by the dotted line 27 in FIG. 1, to the full line position.

The saw blade D may be any suitable conventional band saw blade which is cut to a length corresponding to the circumference of the flywheel defined by the shoulder 10. The width of the saw blade D controls the depth of a cut that can be made in a piece of metal or the like. It is to be understood that any suitable saw blade could be used, depending on the desired number of teeth and the width of the blade.

HOles are punched in the end of the saw blade for receiving the means E for attaching one end of the saw blade to the shoulder 10 of the flywheel adjacent the outer end of the pivotal arm C and for receiving the means F for attaching the other end of the saw blade to the pivotal arm. The means E for attaching one end of the saw blade to the flywheel includes a threaded bolt 28 which has one end anchored in the shoulder 10 of the flywheel with the other threaded end projecting outwardly from the flywheel. One end of the saw blade is placed on the threaded bolt 28 through the hole punched therein, and a nut 29 is threaded on the bolt to secure the end of the saw blade D to the flywheel A. The saw blade D is then wrapped around the flywheel adjacent the shoulder 10 and the other end of the saw blade is placed on a threaded bolt 30 extending outwardly from the end of the pivotal arm C. A nut 31 is provided on the threaded end of the bolt 30 for holding the saw blade in position relative to the end of the pivotal arm. The nut and bolt 31 and 30, respectively, constitutes the means F for attaching the other end of the saw blade to the pivotal arm C. As can be seen, the outer end 32 of the pivotal arm C extends through a slot 33 provided in the shoulder 10 so that the outer end of the pivotal arm C terminates adjacent the periphery of the shoulder 10.

Means G is provided for adjusting the position of the pivotal arm so as to draw the blade D tightly around the shoulder 10. The means G includes a block 34 which is secured to the main body portion 11 of the flywheel by bolts 35. An adjustable threaded bolt 36 extends transversely into the block 34 and has a head 37 adjacent the outer end so that by rotating the bolt 36 such pivots the pivotal arm C. A lock nut 38 is carried on the bolt 36 for locking such in position.

When it is desired to place a saw blade on the flywheel A one end of the saw blade is positioned on the bolt 28 and nut 29 is drawn tightly thereagainst. The saw blade is then wrapped around the shoulder 10 of the flywheel and the other end of the saw blade is positioned on the bolt 30 and secured thereto by a nut 31. The bolt 23 is loosened and then the adjusting bolt 36 is rotated until the blade is drawn tightly on the shoulder. At that time the lock nut 38 on the bolt 36 is drawn tightly against the block to lock such in position. The adjustable bolt 23 is also drawn down tightly to hold the pivotal arm in position.

If it is desired to make a larger cut a strip of cardboard or any suitable material can be placed between the shoulder 10 and the blade D so as to increase the cutting diameter of the saw blade D. As can be seen the saw blade is held tightly against the shoulder of the flywheel with the edge of the blade abutting against the abutment 12. This minimizes chatter and increases the life of the blade. In one particular embodiment the fly weighs approximately 20 pounds so as to produce substantial momentum when it is being rotated in order to provide a uniform speed during the cutting operation.

While a preferred embodiment of the invention has been described using specific terms, such description is for illustrative purposes only, and it is to be understood that changes and variations may be made without departing from the spirit or scope of the following claims.

What is claimed is:

1. A tool capable of being rotated by a power driven rotating member for making curved cuts in material comprising: a circular flywheel, a shaft carried in the center of said flywheel extending vertically from said flywheel for being received by said power driven rotating member, a pivotal arm carried by said flywheel having one end terminating adjacent the periphery of said flywheel, a flexible elongated saw blade having cutting teeth on one edge extending around said circular flywheel, means for attaching one end of said saw blade to said flywheel adjacent said one end of said pivotal arm, means for attaching the other end of said saw blade to said one end of pivotal arm, and means for adjusting said pivotal arm for drawing said saw blade tightly around said circular flywheel.

2. The tool as set forth above in claim 1, wherein said circular flywheel has a shoulder extending around the periphery thereof, and one side of said saw blade abutting said shoulder and being of a width so that said cutting teeth extend beyond said flywheel.

3. The tool as set forth in claim 1, wherein said means for adjusting said pivotal arm includes: a threaded means engaging said pivotal arm so that said pivotal arm is moved by rotating said threaded member.

4. The tool as set forth in claim 1, further comprising: means for locking said pivotal arm in position relative to said flywheel.

5. The tool as set forth in claim 1, wherein said circular flywheel has an abutment adjacent said shoulder, and said blade having an edge engaging said abutment for aiding in stabilizing said blade on said flywheel.

* * * * *